(12) United States Patent
Wei

(10) Patent No.: US 11,409,464 B2
(45) Date of Patent: Aug. 9, 2022

(54) DATA PROCESSING METHOD, APPARATUS, AND SYSTEM

(71) Applicant: Huawei Technologies Co., Ltd., Shenzhen (CN)

(72) Inventor: Mingchang Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 16/134,621

(22) Filed: Sep. 18, 2018

(65) Prior Publication Data

US 2019/0018617 A1 Jan. 17, 2019

Related U.S. Application Data

(63) Continuation of application No. PCT/CN2017/081066, filed on Apr. 19, 2017.

(30) Foreign Application Priority Data

Nov. 22, 2016 (CN) .......................... 201611048856.1

(51) Int. Cl.
*G06F 3/06* (2006.01)

(52) U.S. Cl.
CPC ............ *G06F 3/0659* (2013.01); *G06F 3/061* (2013.01); *G06F 3/0604* (2013.01); *G06F 3/067* (2013.01); *G06F 3/0674* (2013.01); *G06F 3/0689* (2013.01)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885;
(Continued)

(56) References Cited

U.S. PATENT DOCUMENTS

| 5,806,086 A | 9/1998 | Kimmel et al. |
| 7,057,981 B2* | 6/2006 | Kano ............... G06F 3/0665 369/30.58 |

(Continued)

FOREIGN PATENT DOCUMENTS

| CN | 101187849 A | 5/2008 |
| CN | 102236609 A | 11/2011 |

OTHER PUBLICATIONS

How to Fix Corrupted or Damaged Firmware; SERT Data Recovery; Nov. 12, 2015; retrieved from https://web.archive.org/web/20151112031114/https://www.sertdatarecovery.com/hard-drive-data-recovery/how-to-fix-corrupted-or-damaged-firmware/ on Dec. 11, 2019 (Year: 2015).*

(Continued)

*Primary Examiner* — Daniel C. Chappell
(74) *Attorney, Agent, or Firm* — Leydig, Voit & Mayer, Ltd.

(57) ABSTRACT

Embodiments of the present invention disclose a data processing solution. In this solution, a hard disk receives a call instruction sent by a server, where the call instruction includes a function identifier of a to-be-called function and an operation address; and the hard disk calls the function in the hard disk based on the function identifier, and performs, based on the function, an operation on data corresponding to the operation address.

7 Claims, 2 Drawing Sheets

A hard disk receives a call instruction sent by a server 101, where the call instruction includes a function identifier of a to-be-called function and an operation address — 301

The hard disk calls the function in the hard disk based on the function identifier — 302

The hard disk performs, based on the function, an operation on data corresponding to the operation address — 303

(58) Field of Classification Search
CPC .......... G06F 2206/00–20; G06F 2209/00–549;
G06F 2211/00–902; G06F 2212/00–7211;
G06F 2213/00–4004; G06F 2216/00–17;
G06F 2221/00–2153; G11C 11/00–5692;
G11C 13/00–06; G11C 15/00–06; G11C
17/00–18; G11C 2216/00–30
See application file for complete search history.

(56) References Cited

U.S. PATENT DOCUMENTS

| | | | | |
|---|---|---|---|---|
| 7,117,276 B2* | 10/2006 | Maeda | ................ | G06F 3/0607 |
| | | | | 710/36 |
| 7,243,116 B2* | 7/2007 | Suzuki | ................ | G06F 3/0605 |
| | | | | 707/812 |
| 7,281,088 B2* | 10/2007 | Yamazaki | ............ | G06F 3/0653 |
| 7,305,463 B2* | 12/2007 | Kaneda | ................ | G06F 3/0689 |
| | | | | 709/224 |
| 7,337,299 B2* | 2/2008 | Sakaki | ................ | G06F 3/0629 |
| | | | | 711/115 |
| 7,558,912 B2* | 7/2009 | Okamoto | ............ | G06F 3/0635 |
| | | | | 711/147 |
| 7,680,984 B2* | 3/2010 | Kakui | ................ | G06F 3/0613 |
| | | | | 711/204 |
| 8,495,259 B2* | 7/2013 | Bakke | ................ | G06F 3/061 |
| | | | | 710/24 |
| 8,521,955 B2* | 8/2013 | Arulambalam | .... | G11B 20/1217 |
| | | | | 714/6.22 |
| 8,990,588 B2* | 3/2015 | Shimmitsu | ............ | G06F 3/0623 |
| | | | | 711/170 |
| 9,612,759 B2* | 4/2017 | Dasar | ................ | G06F 3/0632 |
| 10,635,529 B2* | 4/2020 | Bolkhovitin | ........ | G06F 11/1068 |
| 2006/0143316 A1 | 6/2006 | Mills et al. | | |
| 2006/0262657 A1* | 11/2006 | Sueyoshi | ............. | G11B 33/126 |
| | | | | 369/1 |
| 2011/0271064 A1 | 11/2011 | Zhong | | |
| 2012/0303905 A1* | 11/2012 | Zhang | ................ | G06F 16/172 |
| | | | | 711/136 |
| 2013/0103902 A1* | 4/2013 | Wei | ................ | G06F 3/0643 |
| | | | | 711/114 |
| 2015/0373115 A1* | 12/2015 | Breakstone | ........... | G06F 3/0685 |
| | | | | 709/217 |

OTHER PUBLICATIONS

Definition of firmware; "The Authoritative Dictionary of IEEE Standards Terms, Seventh Edition," in IEEE Std 100-2000, p. 448; Dec. 11, 2000, doi: 10.1109/IEEESTD.2000.322230. (Year: 2000).*

* cited by examiner

DATA PROCESSING METHOD, APPARATUS, AND SYSTEM

CROSS-REFERENCE TO RELATED APPLICATIONS

This application is a continuation of International Application No. PCT/CN2017/081066, filed on Apr. 19, 2017, which claims priority to Chinese Application No. 201611048856.1, filed on Nov. 22, 2016. The disclosures of the aforementioned applications are hereby incorporated by reference in their entireties.

TECHNICAL FIELD

Embodiments of the present invention relate to the field of information technologies, and in particular, to a data processing method, apparatus, and system.

BACKGROUND

Several hard disks such as a mechanical hard disk or a solid state disk (SSD) may be inserted into a server. The server accesses the hard disk by using an access protocol. Generally, when accessing data in the hard disk, the server first reads the data from the hard disk to a memory of the server, and then processes the data in the memory, for example, queries, modifies, or deletes the data. However, in the foregoing operation process, an input/output (IO) and a processor of the server easily become a performance bottleneck.

SUMMARY

A first aspect of the present invention discloses a data processing solution. The data processing solution is applied to a system that includes a server and a hard disk, and a specific implementation is as follows.

The hard disk receives a call instruction sent by the server, where the call instruction includes a function identifier of a to-be-called function and an operation address; the hard disk calls the function in the hard disk based on the function identifier; and the hard disk performs, based on the function, an operation on data corresponding to the operation address. The function is a computer instruction that can be used to implement a specific action, for example, a function for executing a library. The function may be received by the hard disk by using an interface (such as a non-volatile memory express interface) from the server or a third-party device, and a controller of the hard disk stores the function. The function received by using the interface of the hard disk may be in a source code form or a target code form. The hard disk stores a correspondence between a function identifier and a function memory address. The hard disk calls, based on the correspondence between the function identifier and the function memory address, and the received function identifier, a function at the memory address in a memory of the hard disk, to perform an operation on data corresponding to the operation address. In an implementation, a memory address of the function in the hard disk is used as the identifier of the function. The operation address may be a logical address presented by the hard disk to the server, for example, a logical block address. The server may be a storage array controller, an application server, or the like. In this implementation solution, an amount of data exchanged between the server and the hard disk is reduced, so that IO pressure of the server and processing pressure of a processor of the server are reduced, and performance of the server is improved.

Optionally, the call instruction further includes an execution parameter, the function is a query function, the execution parameter is query content, and that the hard disk performs, based on the function, an operation on data corresponding to the operation address specifically includes: querying, by the hard disk based on the query function and the execution parameter, the data corresponding to the operation address, to obtain a query result.

Optionally, the call instruction further includes an execution parameter, the function is a modification function, the execution parameter is modified data, and that the hard disk performs, based on the function, an operation on data corresponding to the operation address specifically includes: performing, by the hard disk based on the modification function and the execution parameter, a modification operation on the data corresponding to the operation address.

Correspondingly, a second aspect of the present invention further provides a data processing device (such as a hard disk), to implement the various implementations of the first aspect. The data processing device (such as a hard disk) includes structural units that implement the various implementation solutions of the first aspect in the implementation solutions of the present invention.

A third aspect of the present invention provides a hard disk, including an interface, a controller, and a non-volatile storage medium, configured to implement the various implementations of the first aspect in the implementation solutions of the present invention.

A fourth aspect of the present invention further provides a data processing system, including the hard disk and the server described in the various implementations of the first aspect.

Correspondingly, the present invention further provides a non-volatile computer readable storage medium and a computer program product. When a memory of a data processing device (such as a hard disk) provided in the implementation solutions of the present invention loads computer instructions included in the non-volatile computer readable storage medium and the computer program product, and a central processing unit (CPU) of the data processing device (such as a hard disk) executes the computer instructions in the memory, the data processing device (such as a hard disk) can separately perform the various possible implementations of the first aspect in the implementation solutions of the present invention.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following clearly describes the technical solutions in the embodiments of the present invention with reference to the accompanying drawings in the embodiments of the present invention.

Figure 1:
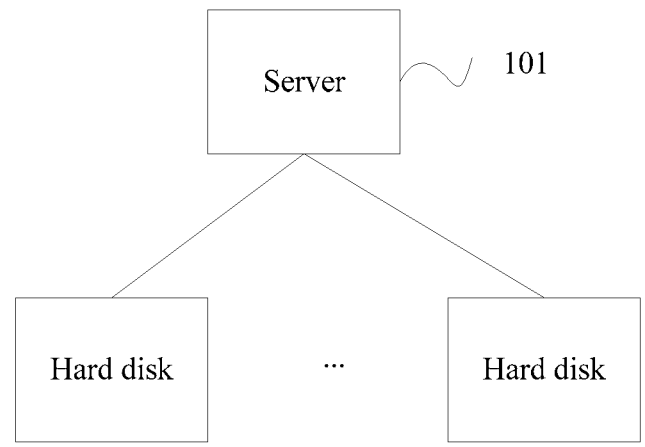
FIG. 1 is a schematic structural diagram of a system according to an embodiment of the present invention.

FIG. 1 is a schematic structural diagram of a system according to an embodiment of the present invention. The system includes a server 101 and a hard disk. The server 101 communicates with the hard disk. The server 101 and the hard disk may be connected by using a network (such as a switching device, a local area network, or a storage network), or may be directly connected. This is not limited in this embodiment of the present invention. In specific implementation, there may be one or more hard disks. The hard disk may use different interfaces, for example, a Serial Advanced Technology Attachment (SATA) interface, a serial attached small computer system interface (SAS), a Peripheral Component Interconnect Express (PCIe) interface, a non-volatile memory express (NVMe) interface, or an Ethernet interface. The hard disk may be a hard disk of different media, such as a mechanical hard disk or an SSD. In this embodiment of the present invention, the server 101 may be an application server such as a universal server, a mainframe server, or a Unix server, or may be a storage array controller. This is not limited in this embodiment of the present invention.

Figure 2:
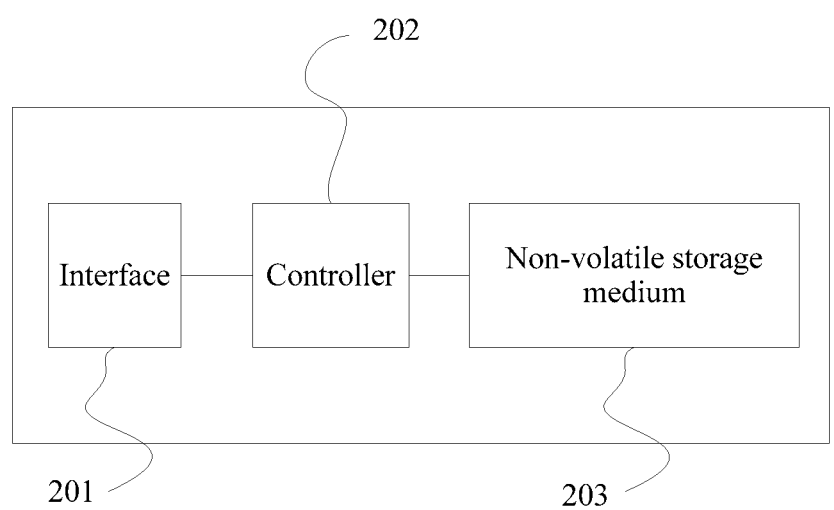
FIG. 2 is a schematic structural diagram of a hard disk according to an embodiment of the present invention.

FIG. 2 shows a structure of the hard disk in the system shown in FIG. 1. The hard disk includes an interface 201, a controller 202, and a non-volatile storage medium 203. The controller 202 may specifically include a central processing unit (CPU) and a memory. The CPU executes an instruction in the memory to implement a function of the controller 202. In addition, to save computing resources of the CPU, a field programmable gate array (FPGA) or other hardware may also be used to perform all operations of the CPU in this embodiment of the present invention; or the FPGA or the other hardware and the CPU are separately used to perform some operations of the CPU in this embodiment of the present invention, so as to implement technical solutions described in this embodiment of the present invention. For ease of description, as commonly described in the embodiments of the present invention, the controller is configured to implement the technical solutions in the embodiments of the present invention. In another implementation, a computer instruction in the memory may be a form of firmware, and the CPU executes the computer instruction in the firmware to implement a function of the controller.

In this embodiment of the present invention, the server 101 offloads an action with specific operation processing to the hard disk in a form of a function. The "offload" in this embodiment of the present invention means installing, to the hard disk in a form of a function, an action originally to be performed by the server. The hard disk executes the function, and returns an execution result to the server, while the following operations are not required: The server 101 first reads, from the hard disk to a memory of the server 101, to-be-processed data corresponding to an operation address, and then the server 101 performs an operation on the data in the memory. In this embodiment of the present invention, the function is a computer instruction that can be used to implement a specific action, for example, a function for executing a library. In this embodiment of the present invention, an amount of data exchanged between the server 101 and the hard disk is reduced, so that IO pressure of the server 101 and processing pressure of a processor of the server 101 are reduced, and performance of the server 101 is improved.

In this embodiment of the present invention, the function in the hard disk may be sent by the server 101 to the hard disk, or may be sent by a third-party device (for example, a management device) to the hard disk. The hard disk receives, by using an interface (such as an NVMe interface or a PCIe interface), a function sent by the server 101 or the third-party device, and stores the function, for example, stores the function to a non-volatile storage medium. The hard disk loads the function from the non-volatile storage medium to the memory of the hard disk when the hard disk is started or receives a call instruction, or the hard disk may directly call the function in a form of firmware. The function received by using the interface may be in a source code form or a target code form. This is not limited in this embodiment of the present invention. The server 101 communicates with the hard disk, and the server 101 stores a function identifier corresponding to each type of function, so as to call a function in the hard disk to perform a specific action. In this embodiment of the present invention, a letter or a number may be used as a function identifier, to represent a corresponding function. For example, in an implementation, A is used to represent a function for performing a query action, and B is used to represent a function for performing a modification action. The server 101 stores a correspondence between a function identifier and a function. The server 101 queries the correspondence between a function identifier and a function based on a corresponding operation requirement, determines a corresponding function identifier, and sends the function identifier and an operation address to the hard disk. The hard disk stores a correspondence between a function identifier and the function memory address. The hard disk queries the correspondence between a function identifier and the function memory address by using the function identifier, and calls a function at a corresponding memory address in the hard disk, to perform an operation on data corresponding to the operation address. In another implementation, the server 101 stores different function memory addresses in the hard disk, to be specific, the function memory addresses are used as function identifiers. The server 101 sends a function memory address and an operation address to the hard disk, and the hard disk calls a function at the function memory address to perform an operation on data corresponding to the operation address. The function memory address is a memory address used to store a function in the memory of the hard disk. In this embodiment of the present invention, the operation address may be a logical address presented by the hard disk to the server, for example, a logical block address (LBA). Alternatively, the operation address may be an object address. This is not limited in this embodiment of the present invention. The hard disk stores a mapping between an operation address and a physical address of a non-volatile storage medium of the hard disk. The hard disk maps, based on the mapping between an operation address and a physical address of a non-volatile storage medium of the hard disk, data corresponding to an operation address from a physical address of a non-volatile storage medium of the hard disk to the memory of the hard disk. The function identifier and the operation address that are sent by the server 101 to the hard disk may be carried in the call instruction.

Figure 3:
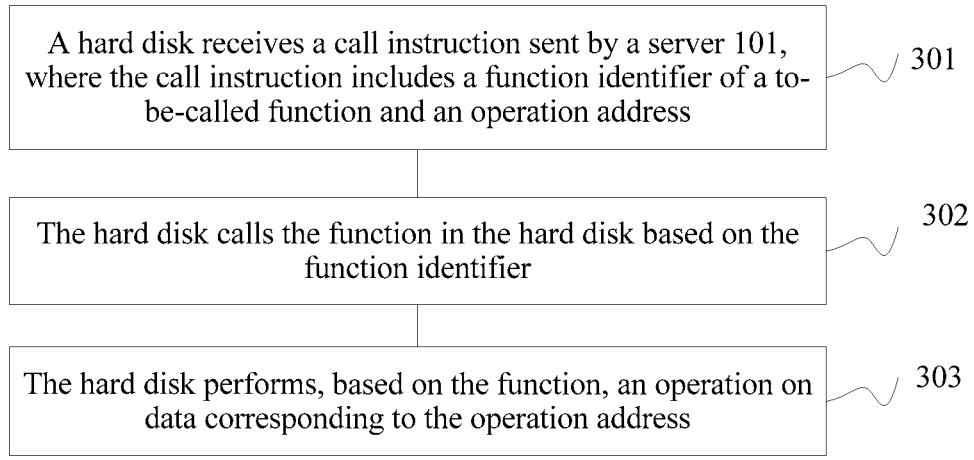
FIG. 3 is a flowchart of data processing according to an embodiment of the present invention.

A data processing procedure in this embodiment of the present invention is shown in FIG. 3, and includes the following steps.

301. A hard disk receives a call instruction sent by a server 101, where the call instruction includes a function identifier of a to-be-called function and an operation address.

As described above, the hard disk parses the call instruction to obtain the function identifier and the operation address.

302. The hard disk calls the function in the hard disk based on the function identifier.

The hard disk calls the function based on the function identifier.

303. The hard disk performs, based on the function, an operation on data corresponding to the operation address.

The hard disk performs, based on the function, such as a function for performing a query action, a modification action, an insertion action, or a deletion action, an operation on the data corresponding to the operation address. The function for performing the query action is referred to as a query function, the function for performing the modification action is referred to as a modification function, the function for performing the insertion action is referred to as an insertion function, and the function for performing the deletion action is referred to as a deletion function.

Subsequently, in this embodiment of the present invention, an example in which the call instruction sent by the server 101 to the hard disk is used to call a query function is used for description. To be specific, the function identifier that is of the to-be-called function and that is carried in the call instruction is a function identifier of the query function, and the operation address is an address corresponding to to-be-queried data. The call instruction further carries an execution parameter, and when the function corresponding to the function identifier in the call instruction is a query function, the execution parameter is query content, to be specific, a to-be-queried object. After receiving the call instruction, the hard disk determines, based on the identifier of the to-be-called function, that the to-be-called function is a query function, and the hard disk calls the query function. The hard disk reads the data corresponding to the operation address to the memory of the hard disk. For example, the to-be-queried object is a quantity of ones at the operation address. In this case, the hard disk queries, by using the query function and based on the execution parameter, the quantity of ones stored at the operation address, so as to obtain a query result, and return the query result to the server 101. In this embodiment of the present invention, the hard disk does not need to return, to the server 101, the data corresponding to the operation address, and the server 101 does not need to perform a query operation in the memory of the server 101, but directly obtains the query result from the hard disk. Therefore, in this embodiment of the present invention, an amount of data exchanged between the server 101 and the hard disk is reduced, so that IO pressure of the server 101 and processing pressure of a processor of the server 101 are reduced, and performance of the server 101 is improved.

In this embodiment of the present invention, an example in which the call instruction sent by the server 101 to the hard disk is used to call a modification function is used for description. To be specific, the function identifier that is of the to-be-called function and that is carried in the call instruction is a function identifier of the modification function, and the operation address is an address corresponding to to-be-modified data. The call instruction further carries an execution parameter, and when the function corresponding to the function identifier in the call instruction is a modification function, the execution parameter is modified data, to be specific, new data to be written at an address of a specific length. After receiving the call instruction, the hard disk determines, based on the function identifier of the to-be-called function, that the to-be-called function is a modification function, and the hard disk calls the modification function. The hard disk reads the data corresponding to the operation address to the memory of the hard disk. For example, the modified data is to write, to 1, all content that is at the operation address and that has a continuous length of 4 Kb from an initial address of the operation address. In this case, the hard disk writes, to 1, all the content that is at the operation address and that has the continuous length of 4 Kb from the initial address of the operation address by using the modification function and based on the execution parameter. The hard disk stores dirty data that is corresponding to the operation address and that is buffered in the memory of the hard disk, to update the content at the operation address to modified content. The dirty data is data that is modified after the data is read into a memory of a hard disk, but not written into a medium of the hard disk. In this embodiment of the present invention, the hard disk does not need to return, to the server 101, the data corresponding to the operation address, and the server 101 does not need to modify the data corresponding to the operation address in the memory of the server 101 or subsequently write the data to the hard disk either, but directly completes data modification in the hard disk. Therefore, in this embodiment of the present invention, an amount of data exchanged between the server 101 and the hard disk is reduced, so that IO pressure of the server 101 and processing pressure of a processor of the server 101 are reduced, and performance of the server 101 is improved.

In this embodiment of the present invention, the function may alternatively be a deletion function. The call instruction sent by the server 101 to the hard disk is used to call a deletion function. To be specific, the function identifier that is of the to-be-called function and that is carried in the call instruction is an identifier of the deletion function, and the operation address is an address corresponding to to-be-deleted data. The hard disk calls the deletion function, and the hard disk sets, as invalid based on the deletion function, metadata of the data corresponding to the operation address in the memory of the hard disk, in other words, deletes the data corresponding to the operation address.

In this embodiment of the present invention, the function called by using the call instruction may alternatively be an insertion function, or the like. The functions are not enumerated in this embodiment of the present invention.

With reference to FIG. 2, various implementations described in this embodiment of the present invention are specifically: receiving, by an interface of a hard disk, a call instruction, and calling, by a controller of the hard disk, a function in the hard disk based on a function identifier, and performing, based on the function, an operation on data corresponding to an operation address.

Figure 4:
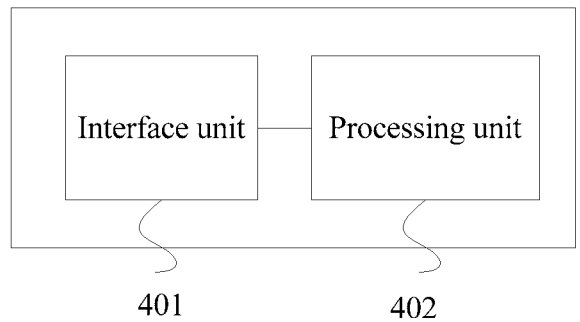
FIG. 4 is a schematic structural diagram of a data processing apparatus according to an embodiment of the present invention.

Correspondingly, an embodiment of the present invention discloses a data processing apparatus shown in FIG. 4. The data processing apparatus communicates with a server, and the data processing apparatus includes an interface unit 401 and a processing unit 402. The interface unit 401 is configured to receive a call instruction sent by the server, and the call instruction includes a function identifier of a to-be-called function and an operation address. The processing unit 402 is configured to: call the function in a hard disk based on the function identifier, and perform, based on the function, an operation on data corresponding to the operation address. Optionally, the interface unit 401 is further configured to receive the function sent by the server. Optionally, the interface unit 401 is an NVMe interface. Optionally, the call instruction further includes an execution parameter, the function is a query function, and the execution parameter is query content. The processing unit 402 is specifically configured to query, based on the query function and the execution parameter, the data corresponding to the operation address, to obtain a query result. Optionally, the call instruction further includes an execution parameter, the function is a modification function, and the execution parameter is modified data. The processing unit 402 is specifically configured to perform, based on the modification function and the execution parameter, a modification operation on the data corresponding to the operation address.

The data processing apparatus shown in FIG. 4 may be applied to the hard disk, to perform content of the foregoing embodiments of the present invention. For a specific implementation and an effect, refer to detailed descriptions in the foregoing embodiments. Details are not described herein again.

For the data processing apparatus shown in FIG. 4, in an implementation, the foregoing units are installed on the data processing apparatus, the foregoing units may be loaded into a memory of the data processing apparatus, and a CPU in the data processing apparatus executes an instruction in the memory, so as to implement functions in the corresponding embodiments of the present invention. In another implementation, the units included in the data processing apparatus may be implemented by hardware, or implemented by a combination of hardware and the CPU executing the instruction in the memory. The foregoing units are also referred to as structural units.

An embodiment of the present invention further provides a non-volatile computer readable storage medium and a computer program product, and computer instructions are included in the non-volatile computer readable storage medium and the computer program product. A CPU executes the computer instructions loaded in a memory, so as to implement functions corresponding to the data processing apparatus (for example, a hard disk) in the embodiments of the present invention.

In the several embodiments provided in the present invention, it should be understood that the disclosed apparatus and method may be implemented in other manners. For example, the unit division in the described apparatus embodiment is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

What is claimed is:

1. A data processing method, comprising:
receiving and storing, by a hard disk, a function sent by a server, wherein the hard disk stores the function at a function memory address in a non-volatile storage medium of the hard disk;
receiving, by the hard disk, a call instruction sent by the server, wherein the call instruction comprises a function identifier of the function and an operation address;
querying, by the hard disk, a correspondence between the function identifier and the function memory address using the function identifier;
calling, by the hard disk, the function at the function memory address in the hard disk; and
performing, by the hard disk based on the function, an operation on data corresponding to the operation address,
wherein the call instruction further comprises an execution parameter, the function is a query function, the execution parameter is query content, and the method further comprises:
querying, by the hard disk based on the query function and the execution parameter, the data corresponding to the operation address, to obtain a query result, wherein the query result indicates only whether the query content is present in the data corresponding to the operation address; and
returning, by the hard disk, only the query result to the server.

2. The method according to claim 1, wherein the hard disk receives the function sent by the server by using a non-volatile memory express (NVMe) protocol.

3. The method according to claim 1, wherein the server is a storage array controller.

4. The method according to claim 1, wherein the server is an application server.

5. A hard disk, comprising an interface, a controller, and a non-volatile storage medium; wherein:
the interface is configured to receive a call instruction sent by a server, wherein the call instruction comprises a function identifier of a function and an operation address; and
the controller is configured to:
query a correspondence between the function identifier and a function memory address using the function identifier,
call the function at the function memory address in the hard disk, and
perform, based on the function, an operation on data corresponding to the operation address;
wherein the interface is further configured to receive the function sent by the server, and the controller is configured to store the function to the non-volatile storage medium at the function memory address; and
wherein the call instruction further comprises an execution parameter, the function is a query function, the execution parameter is query content, and the controller is further configured to:
query, based on the query function and the execution parameter, the data corresponding to the operation address, to obtain a query result, wherein the query result indicates only whether the query content is present in the data corresponding to the operation address; and
return only the query result to the server.

6. The hard disk according to claim 5, wherein the interface supports a non-volatile memory express (NVMe) protocol.

7. A data processing system, comprising: a server and a hard disk;
  wherein the server is configured to send a call instruction to the hard disk, wherein the call instruction comprises a function identifier of a function and an operation address; and
  wherein the hard disk is configured to:
    receive the call instruction sent by the server,
    query a correspondence between the function identifier and a function memory address using the function identifier,
    call the function at the function memory address in the hard disk, and perform, based on the function, an operation on data corresponding to the operation address;
  wherein the server is further configured to send the function to the hard disk via an interface;
  wherein the hard disk is further configured to receive the function via the interface and store the function at the function memory address;
  wherein the call instruction further comprises an execution parameter, the function is a query function, the execution parameter is query content, and the hard disk is further configured to:
    query, based on the query function and the execution parameter, the data corresponding to the operation address, to obtain a query result, wherein the query result indicates only whether the query content is present in the data corresponding to the operation address; and
    return only the query result to the server.

* * * * *